(12) United States Patent
Lee et al.

(10) Patent No.: US 7,864,073 B2
(45) Date of Patent: Jan. 4, 2011

(54) APPARATUS AND METHOD OF PROVIDING SCHEDULE AND ROUTE

(75) Inventors: Hye-jeong Lee, Seoul (KR); Jong-ho Lea, Seongnam-si (KR); Hee-seob Ryu, Suwon-si (KR); Ji-hye Chung, Seoul (KR); Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 499 days.

(21) Appl. No.: 11/979,789

(22) Filed: Nov. 8, 2007

(65) Prior Publication Data

US 2008/0165032 A1 Jul. 10, 2008

(30) Foreign Application Priority Data

Jan. 5, 2007 (KR) ............... 10-2007-0001597

(51) Int. Cl.
*G08G 1/123* (2006.01)
(52) U.S. Cl. .................. 340/988; 340/992; 340/993; 340/994; 340/928; 340/506; 701/202; 701/204
(58) Field of Classification Search ............ 340/988, 340/992, 993, 994, 928, 506; 701/202, 204
See application file for complete search history.

(56) References Cited

U.S. PATENT DOCUMENTS 5,790,974 A * 8/1998 Tognazzini ............ 455/456.5
6,381,534 B2 * 4/2002 Takayama et al. .......... 701/201
6,662,105 B1 * 12/2003 Tada et al. ................ 701/209

FOREIGN PATENT DOCUMENTS

| JP | 2002-107174 | 4/2002 |
|----|-------------|--------|
| JP | 2005-164384 | 6/2005 |
| KR | 10-2004-0037324 | 5/2004 |
| KR | 10-2006-0081193 | 7/2006 |

* cited by examiner

*Primary Examiner*—Tai T Nguyen
(74) *Attorney, Agent, or Firm*—Staas & Halsey LLP

(57) ABSTRACT

An apparatus and method of providing a schedule and a route are provided in which the apparatus includes an information collection unit analyzing input information and extracting an event to be added to a first schedule, a pattern recognition unit extracting an activity pattern of a user with reference to a past route and past event information, and a generation unit applying the activity pattern to at least one event of the first schedule and the extracted event to generate a second schedule, generating a first route between event locations with reference to position information and time information of each event in the second schedule, generating a third schedule, to which an additional event is added, with reference to a transition time between the event locations and an actual event time, and generating a second route for the additional event in the third schedule.

19 Claims, 8 Drawing Sheets

FIG. 5

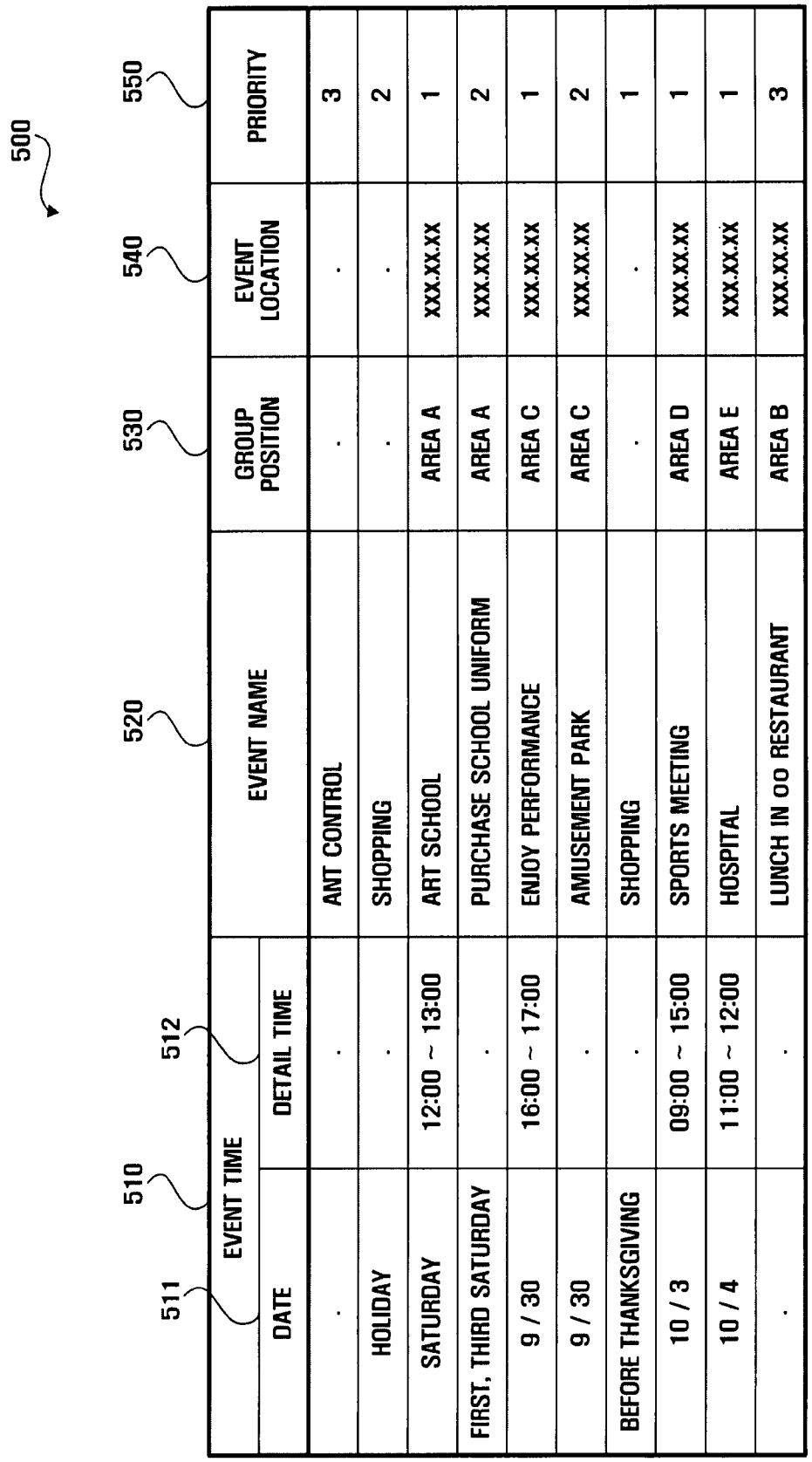

| EVENT TIME | | EVENT NAME | GROUP POSITION | EVENT LOCATION | PRIORITY |
|---|---|---|---|---|---|
| DATE | DETAIL TIME | | | | |
| 511 | 512 | 520 | 530 | 540 | 550 |
| . | . | ANT CONTROL | . | . | 3 |
| HOLIDAY | . | SHOPPING | . | . | 2 |
| SATURDAY | 12:00 ~ 13:00 | ART SCHOOL | AREA A | xxx.xx.xx | 1 |
| FIRST, THIRD SATURDAY | 16:00 ~ 17:00 | PURCHASE SCHOOL UNIFORM | AREA A | xxx.xx.xx | 2 |
| 9/30 | . | ENJOY PERFORMANCE | AREA C | xxx.xx.xx | 1 |
| 9/30 | . | AMUSEMENT PARK | AREA C | xxx.xx.xx | 2 |
| BEFORE THANKSGIVING | . | SHOPPING | . | . | 1 |
| 10/3 | 09:00 ~ 15:00 | SPORTS MEETING | AREA D | xxx.xx.xx | 1 |
| 10/4 | 11:00 ~ 12:00 | HOSPITAL | AREA E | xxx.xx.xx | 1 |
| . | . | LUNCH IN oo RESTAURANT | AREA B | xxx.xx.xx | 3 |

SCHEDULE TABLE

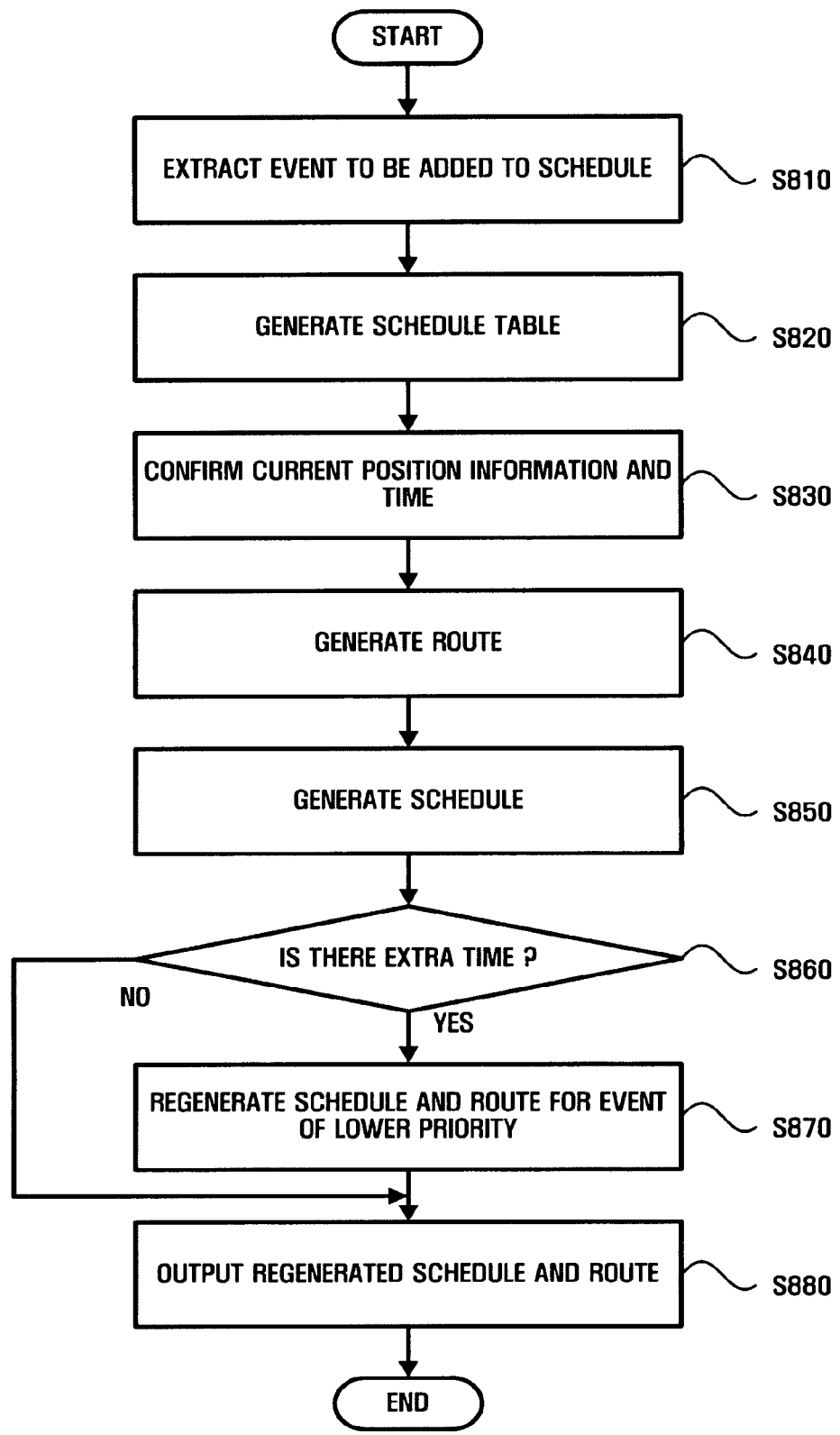

APPARATUS AND METHOD OF PROVIDING SCHEDULE AND ROUTE

CROSS-REFERENCE TO RELATED APPLICATIONS

This application claims priority from Korean Patent Application No. 10-2007-0001597 filed on Jan. 5, 2007 in the Korean Intellectual Property Office, the disclosure of which is incorporated herein by reference in its entirety.

BACKGROUND

1. Field

The present invention relates to an apparatus and method of providing a schedule and a route, and in particular, to an apparatus and method of providing a schedule and a route that provides a route according to a schedule of a user in consideration of various factors related to activity patterns and activities of the user.

2. Description of the Related Art

There are known apparatuses (hereinafter, referred to as "navigation") that provide a route of a road using a tracking system, such as GPS, etc. The navigation confirms its own position using a GPS receiver and provides a route to a user from the current position to a destination using the confirmed position and a map stored in a storage unit.

Generally, in providing a route from a start point to a destination, the navigation provides a highway-oriented route, a surface street-oriented route, a shortest route, or a recommended route according to the selection of the user. The user can select one of the routes to be provided according to his/her preference and can be provided with the corresponding route.

Further, the user can input his/her schedule in a portable apparatus, such as a cellular phone or a PDA, and can confirm the schedule through a notice message from the portable apparatus.

As such, the user can follow the route according to the schedule using the navigation and the portable apparatus. However, the navigation searches a route on the basis of the location of the portable apparatus, and it is difficult to provide a route according to the user's preference and schedule. Further, the portable apparatus provides the route according to the user's schedule, but has a disadvantage in that the user is not able to input the detailed schedule.

Accordingly, there is a need for an apparatus that can easily receive the user's preference and schedule, reconstruct the user's schedule on the basis of information inputted to the apparatus, and provide a route according to the reconstructed schedule.

SUMMARY

An aspect of the present embodiments is to provide an apparatus and method that plans a user's schedule in consideration of various factors related to activity patterns and activities of a user and provides a route according to the planned schedule.

Additional aspects and/or advantages will be set forth in part in the description which follows and, in part, will be apparent from the description, or may be learned by practice of the invention.

The foregoing and/or other aspects are achieved by providing an apparatus providing a schedule and a route, the apparatus including an information collection unit analyzing input information and extracting an event to be added to a first schedule, a pattern recognition unit extracting an activity pattern of a user with reference to a past route and past event information, and a generation unit applying the activity pattern to at least one event of the first schedule and the extracted event to generate a second schedule, generating a first route between event locations with reference to position information and time information of each event in the second schedule, generating a third schedule, to which an additional event is added, with reference to a transition time between the event locations and an actual event time, and generating a second route for the additional event in the third schedule.

The foregoing and/or other aspects are achieved by providing a method of providing a schedule and a route, the method including analyzing input information and extracting an event to be added to a first schedule, extracting an activity pattern of a user with reference to a past route and past event information, applying the activity pattern to at least one event of the first schedule and the extracted event to generate a second schedule, generating a first route between event locations with reference to position information and time information of each event in the second schedule, generating a third schedule, to which an additional event is added, with reference to a transition time between the event locations and an actual event time, and generating a second route for the additional event in the third schedule.

The foregoing and/or other aspects are achieved by providing an apparatus providing a schedule and a route for a user, the apparatus including an information collecting unit receiving and analyzing input information; and a generation unit generating a route between at least a first event location and a second event location and a schedule of events, based on location information, time information and the analyzed input information.

BRIEF DESCRIPTION OF THE DRAWINGS

The above and other features and advantages of the present invention will become more apparent by describing in detail embodiments thereof with reference to the attached drawings in which:

FIG. 5 is a diagram showing a schedule table relative to the user's events according to an embodiment of the present invention;

FIG. 8 is a flowchart showing a process of providing a schedule and a route according to an embodiment of the present invention.

DETAILED DESCRIPTION OF THE EMBODIMENTS

Figure 1:
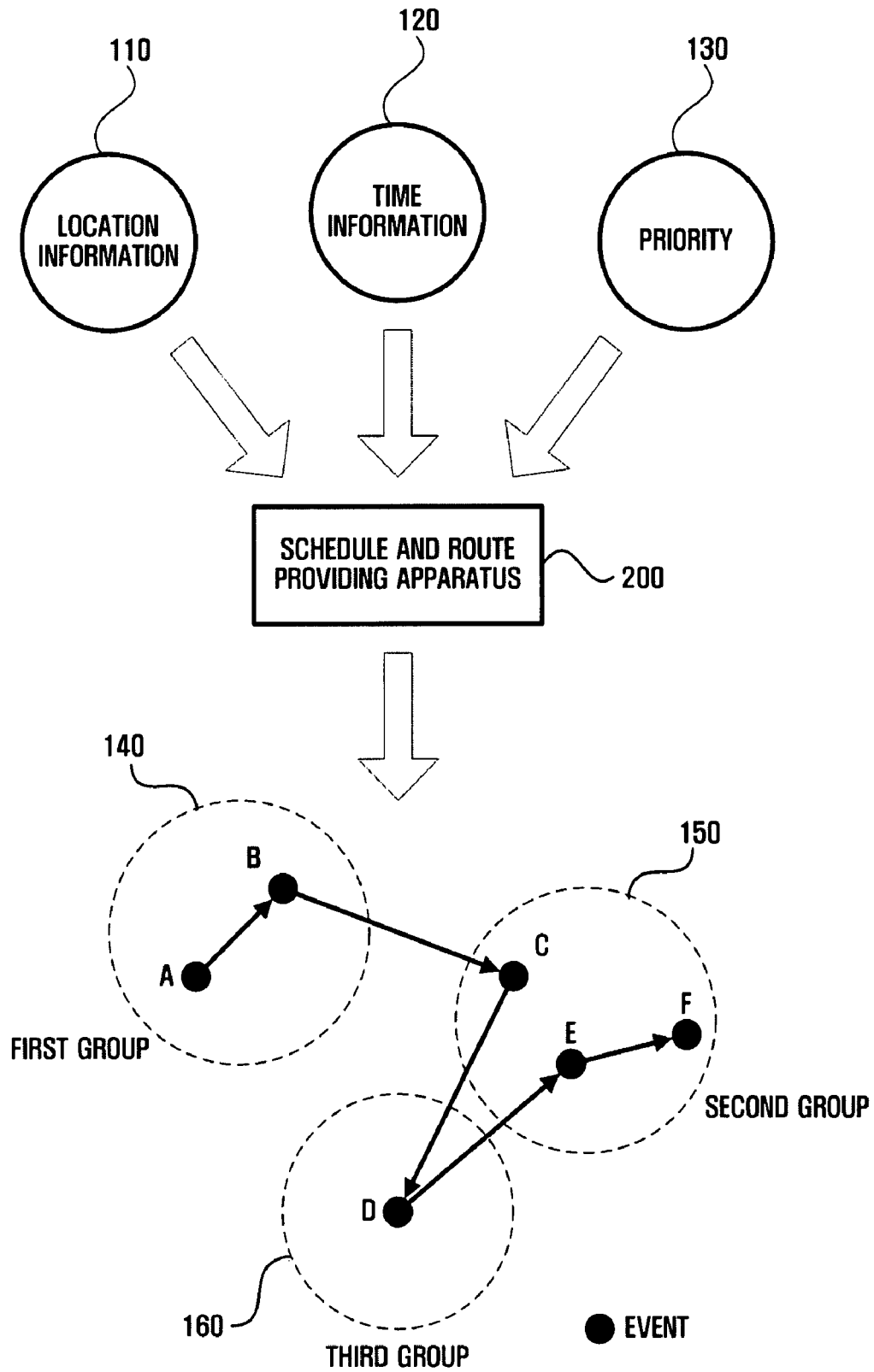
FIG. 1 is a diagram showing a case where a schedule and a route are generated according to an embodiment of the present invention.

Advantages and features of the present invention and methods of accomplishing the same may be understood more readily by reference to the following detailed description of embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the present invention to those skilled in the art, and the present invention will only be defined by the appended claims. Like reference numerals refer to like elements throughout the specification.

Hereinafter, an embodiment of the present invention will be described in detail with reference to the accompanying drawings.

FIG. 1 is a diagram showing a case where a schedule and a route are generated according to an embodiment of the present invention.

With the development of technologies, modern people (hereinafter, referred to as "user") have an increasing amount or number of events to process, and some of the events require a transition from one location to another location. The present embodiment plans a schedule and provides a route according to the planned schedule in consideration of event locations and event times such that the user can perform as many required or desired events as possible within a given period. Further, according to the present embodiment, in planning a schedule, an event at a current position of the user or an event at an adjacent location are added to a schedule, thereby reducing transition time. Further, a desired event, not an indispensable event, may be added to a schedule on the basis of the location for the indispensable event.

FIG. 1 is a diagram showing a case where an apparatus to provide a schedule and a route (hereinafter, referred to as "schedule and route providing apparatus") 200 provides a route according to a user's schedule with reference to various kinds of information, such as location information 110, time information 120, and priority information 130.

Here, the location information 110 includes the current position of the user and event locations. That is, the schedule and route providing apparatus 200 provides a route with the current position of the user as the start point. Alternatively, when the user inputs a specified point as the start point, the schedule and route providing apparatus 200 may provide a route with the input point as the start point.

The time information 120 includes the current time, a transition time, and an event time. That is, the schedule and route providing apparatus 200 provides the route with reference to a time from the current time until the user transits, starts the event, and then completes the event. Further, when the user inputs a specified time as the start time, the schedule and route providing apparatus 200 may provide the route with reference to an expected time from the input time until the user transits, performs the event, and then completes the event.

The priority information 130 is an event priority. Specifically, the schedule and route providing apparatus 200 causes an event having a high priority 130 to be necessarily performed and determines whether or not to perform an event having a low priority 130 with reference to the location information or the time information.

The route that is provided by the schedule and route providing apparatus 200 may be determined according to event location groups. FIG. 1 shows three event location groups 140, 150, and 160. The schedule and route providing apparatus 200 constructs a schedule and provides a route such that the user preferentially performs the events of a specified event location group. Further, the route may include the transition between the event location groups according to the location information 110, the time information 120, and the priority information 130.

A description will be given by way of the event location groups shown in FIG. 1. The schedule and route providing apparatus 200 causes the user to sequentially perform, for example, events A and B in the first group 140 and then to perform an event C in the second group 150. Here, of the events in the second group 150, when a time interval between the start time of an event E and the completion time of the event C is large or when the priority of the event E or an event F is low, the schedule and route providing apparatus 200 causes the user to perform an event D in the third group 160 and then to perform the events E and F in the second group 150, instead of causing the user to perform the event E after the event C is completed.

Further, the schedule and route providing apparatus 200 may provide the schedule and the route in consideration of a transition means and a transition time, as well as various kinds of information, such as weather or traffic, and the current position of the user and the current time, or may provide the schedule and the route with reference to an activity pattern of the user.

Figure 2:
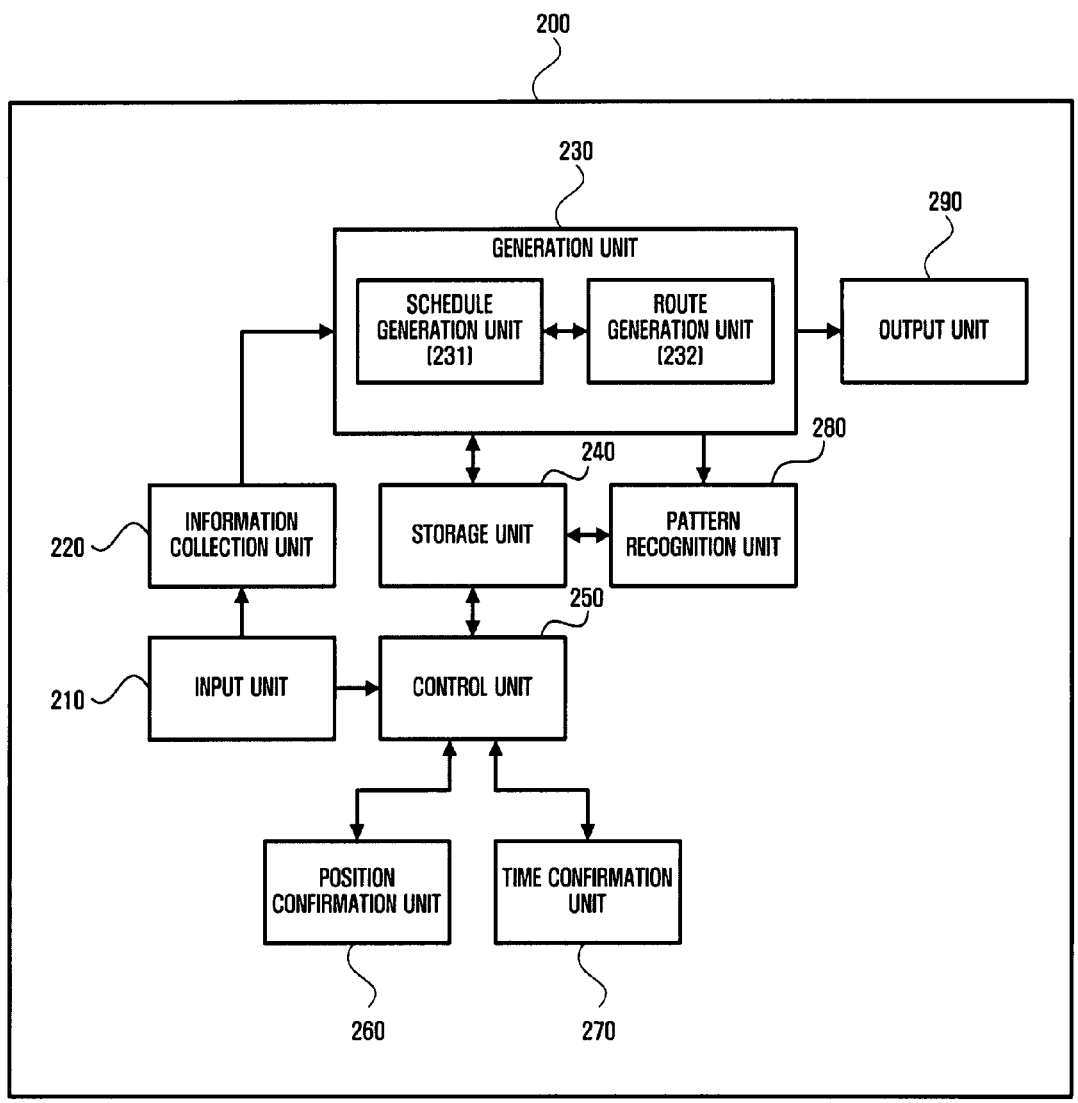
FIG. 2 is a block diagram showing an apparatus to provide a schedule and a route according to an embodiment of the present invention.

FIG. 2 is a block diagram showing a schedule and route providing apparatus 200 according to an embodiment of the present invention. The schedule and route providing apparatus 200 includes an input unit 210, an information collection unit 220, a generation unit 230, a storage unit 240, a control unit 250, a position confirmation unit 260, a time confirmation unit 270, a pattern recognition unit 280, and an output unit 290.

The input unit 210 receives group position information about event location groups, each having at least one predetermined event, and group time information about the start time of the event. Here, the input unit 210 may be an input device, such as a button, a wheel, a touch pad, or a touch screen, etc., or may be a communication device that receives an email or a short message.

The user can input the position information of the event location group and the start time of the event in the corresponding event location group so as to receive the schedule and the route from the schedule and route providing apparatus 200. For example, referring to FIG. 1, the user can input the position information of the first group and the start time of the event A through the input unit 210.

Meanwhile, when the position confirmation unit 260 and the time confirmation unit 270 described below are provided in the schedule and route providing apparatus 200, the control unit 250 can determine an event location group and an event start time using the current position and the current time confirmed by the position confirmation unit 260 and the time confirmation unit 270.

Further, the input unit 210 can receive information (hereinafter, referred to as "event information") about an event that the user wants to perform in the future. The event information may include an event location, an event start time, an estimated event completion time, an event name, and a priority level. In addition, the input unit 210 can receive a state of the event. For example, when the event is completed, the user can input, through the input unit 210, a flag indicating that the corresponding event is completed. Meanwhile, when the user should transit to the next event location, in a state where the corresponding event is not completed, the user can input, through the input unit 210, a flag indicating that the corresponding event is not completed. The judgment of the event completion may be performed by the control unit 250. In this case, the control unit 250 can judge, with reference to the current position and the current time confirmed by the position confirmation unit 260 and the time confirmation unit 270, whether or not the event is completed. For example, when the user stops at a location for a specified event for a predetermined time and then transits to the next event location, the control unit 250 judges that the specified event is completed.

Further, the control unit 250 confirms the events performed by the user and the events not performed by the user, and stores the confirmed events in the storage unit 240. As regards the schedule and the route generated by the generation unit 230, the user may perform the events according to the corresponding information or may correct the schedule and route and perform the events according to the corrected schedule and route. The control unit 250 confirms the schedule and the route actually performed by the user (hereinafter, referred to as "past event information") regardless of the information output from the output unit 290 and stores the confirmed schedule and route in the storage unit 240.

The information input through the input unit 210 is transferred to the information collection unit 220, and the information collection unit 220 analyzes the information input through the input unit 210 to extract an event to be added to the schedule. For example, when an email or a short message is input through the input unit 210, the information collection unit 220 analyzes terms, words, or sentence structures of the email or the short message to extract details related to an event to be performed by the user, that is, the event location and event time.

The generation unit 230 includes a schedule generation unit 231 and a route generation unit 232. The event information input through the input unit 210 and the event information extracted by the information collection unit 220 are transferred to the schedule generation unit 231, and the schedule generation unit 231 generates a schedule relative to events including at least one of an event name, group position information, event position information, event time information, and a priority, and updates the schedule table with the generated schedule. The details of the schedule table will be described below with reference to FIG. 5.

Further, the schedule generation unit 231 may correct the event information (for example, the start time of each event) described in the schedule table with reference to the activity pattern of the user or add additional event information. For example, when the user usually has lunch from noon to 1 p.m., even if the user does not input corresponding event information, the schedule generation unit 231 may add the corresponding event information to the schedule table. Further, when an event described in the schedule table is set from 11:30 to 12:30, the schedule generation unit 231 may correct the schedule table such that the event time of the corresponding event is changed to 11:00 to 12:00 and the lunch time is changed to 12:00 to 1:00. Alternatively, when the priority of the corresponding event is low, the event time of the corresponding event may be reset after 1:00. Here, the activity pattern of the user can be judged by the pattern recognition unit 280. That is, the pattern recognition unit 280 extracts the activity pattern of the user with reference to the route (that is, the past route) searched by the route generation unit 232 and the past event information stored in the storage unit 240.

The event location group can be set by the schedule generation unit 231. That is, the schedule generation unit 231 sets an event location group including at least one event with reference to position information of each event in the schedule table and the activity pattern of the user. Further, the schedule generation unit 231 can extract an expected time required for each event in the event location group to generate a schedule, and then update the schedule table using the generated schedule.

The event location group may be set on the basis of districts, for example, or may have events within a predetermined radius on the basis of a specified point. At this time, the schedule generation unit 231 may set the event location group with reference to terms in the names of the event locations.

The storage unit 240 stores the schedule table, the past route, and the past event information. The storage unit 240 is a module in which information can be input and output to and from, such as a hard disk, a flash memory, a CF card (Compact Flash Card), an SD card (Secure Digital Card), an SM card (Smart Media Card), an MMC card (Multimedia Card), a memory stick, etc. The storage unit 240 may be provided in the schedule and route providing apparatus 200 or may be provided in a separate apparatus. When the storage unit 240 is provided in a separate apparatus, the schedule and route providing apparatus 200 may include a communication device (not shown) that can perform communication with the storage unit 240.

The route generation unit 232 searches the route between event locations with reference to at least one of the group position information, the group time information, the event position information about the event location where the event is performed, the event time information about the event time, and the transition time between the event locations.

In generating the schedule and the route, the generation unit 230 can generate the schedule and route of the user with reference to the priorities of the events. For example, the generation unit 230 allows the events having a higher priority to be performed preferentially, and allows the events having a lower priority to be performed when there is extra time.

Further, the generation unit 230 can determine whether or not to include an event location, in which an event in a different event location group from a specified event location group is performed, in the route. For example, the generation unit 230 allows the event in the event location group at the current position of the user to be performed preferentially, and allows the events in a different event location group to be performed when there is extra time. At this time, the generation unit 230 can determine whether or not to perform the event in the different event location group with reference to the transition time between the current event location group and the different event location group and with reference to available transportation.

In the route search, the route generation unit 232 may refer to current position information and current time information. Specifically, when the user inputs a specified event location group or a specified event, the route generation unit 232 searches a route considering a transition time between the event locations, an event time of each event, and available transportation between the event locations with the current position of the user and the current time as the start point and start time, such that the user can perform an event in the corresponding event location group or can perform a specified event.

The current position information and the current time information can be confirmed by the position confirmation unit 260 and the time confirmation unit 270.

That is, the position confirmation unit 260 confirms information about a geographical position where the schedule and route providing apparatus 200 is located. To this end, the position confirmation unit 260 may have a GPS receiver, or any other position determining device.

Meanwhile, the position confirmation unit 260 can confirm the current position using various systems, including, for example, a cell tracking system using a mobile phone network and a distance calculation system that senses electric wave signals to be received in a frequency band allocated by a frequency sharing system, in addition to a system using a GPS. The cell tracking system is a method that uses analysis of electric wave sensitivities between base stations, and an error tolerance may be 500 to 1,500 m.

In order to confirm the current time information, the time confirmation unit 270 may include and use, for example, a predetermined timer, may use a clock of the GPS receiver provided in the position confirmation unit 260, or any other time confirming device.

Further, the generation unit 230 can regenerate a schedule including only events which can be performed between the start time and completion time input by the user among the events in the schedule, and can generate a route with reference to the regenerated schedule. Accordingly, if the user inputs a time range, such as a day, a week, or a month, the user can be provided with a schedule relative to the corresponding time range.

The output unit 290 outputs the schedule generated by the generation unit 230 and the route searched by the route generation unit 232. Here, the output unit 290 may display the schedule and route on a screen, output voice information, etc. To this end, the output unit 290 may include a display unit (not shown), a speaker (not shown), and a conversion unit (not shown) that analyzes the schedule and the route to convert them into voice information.

Further, the output unit 290 may include a predetermined network device. The output unit 290 may transmit the search result through a network using the network device.

Figure 3:
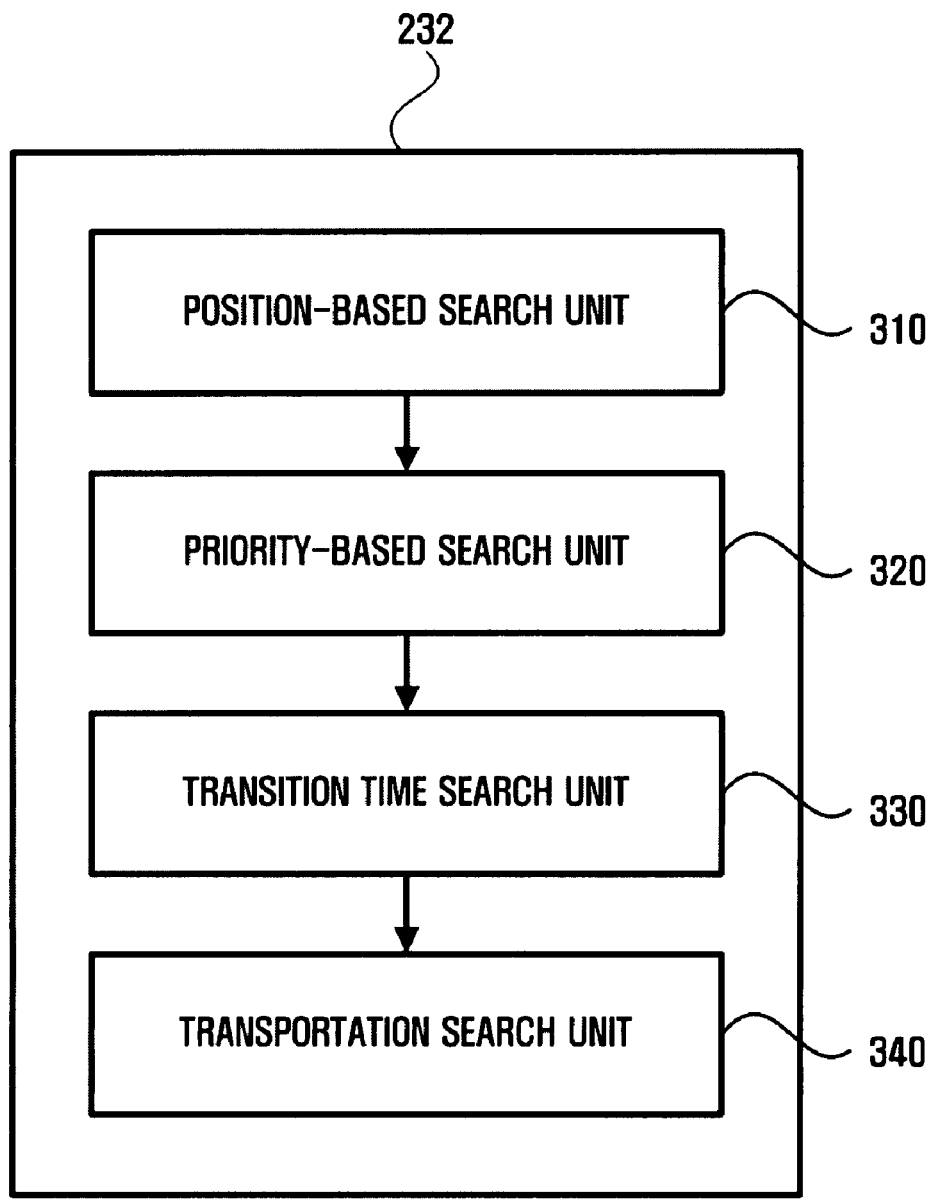
FIG. 3 is a block diagram showing the detailed configuration of a route generation unit shown in FIG. 2 according to an embodiment of the present invention.

FIG. 3 is a block diagram showing the detailed structure of the route generation unit 232 shown in FIG. 2. The route generation unit 232 includes a position-based search unit 310, a priority-based search unit 320, a transition time search unit 330, and a transportation search unit 340.

The position-based search unit 310 searches a route on the basis of the current position of the user or an event location. For example, in searching a route to cause the user to perform a plurality of events in an event location group, the position-based search unit 310 searches a route such that the event locations are located at a close range.

The priority-based search unit 320 searches a route according to the priorities allocated to the individual events. That is, the priority-based search unit 320 searches the route such that the events having a higher priority among a plurality of events in the event location group are performed preferentially.

The transition time search unit 330 searches a route on the basis of the transition time between the event locations. That is, the transition time search unit 330 searches the route such that the transition time between the event locations is minimized.

The transportation search unit 340 searches transportation that can be rapidly and easily used by the user between the event locations.

As such, the route generation unit 232 searches the route of the user according to various conditions. In addition, the route generation unit 232 can search the route in consideration of all the conditions.

For example, even if a point A is located near the current point, and a point B is distant from the current point, when the priority of an event at point A is low, point B that is distant from the current position and where an event having a higher priority exists is connected to the current point.

Further, the route generation unit 232 can search the route of the user by applying weighted values of the conditions. For example, it is assumed that point A is close to the current point and the event at point A has a lower priority, while point B is distant from the current point and the event at point B has a higher priority. Here, when a transition distance has a higher weighted value than the priority of the event, the route generation unit 232 connects the current point and point A. Meanwhile, when the priority has a higher weighted value than the transition distance, the route generation unit 232 connects the current point and point B. Here, the weighted value may be set by the user or may be set by the generation unit 230 after the activity pattern of the user is confirmed.

Figure 4:
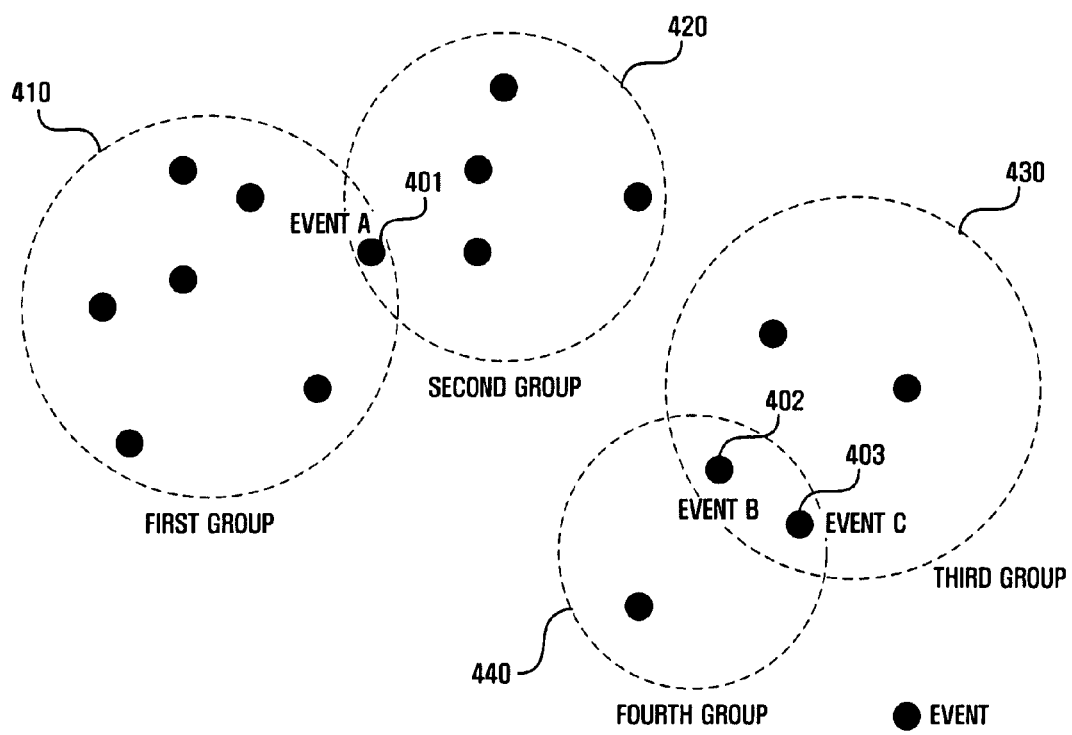
FIG. 4 is a diagram showing a case where user's events are grouped according to locations according to an embodiment of the present invention.

FIG. 4 is a diagram showing a case where the events of the user are grouped by the locations according to an embodiment of the present invention. In FIG. 4, each of groups 410, 420, 430, and 440 includes a plurality of events.

Here, the groups 410, 420, 430, and 440 may be divided on the basis of districts or may be set by the user. The districts may have various sizes according to the units, higher districts may form one group, lower districts may form another group, and one group may include another group therein.

When the user directly sets the groups, the user can set a group including all events within a predetermined radius on the basis of a specified event location or a specified point. Further, the user can set a range of a group in a polygonal shape or a geometrical shape.

Two or more groups can include a specified event simultaneously. For example, an event A 401 can be included in the first group 410 and the second group 420 simultaneously, and an event B 402 and an event C 403 may be included in the third group 430 and the fourth group 440 simultaneously.

As such, if the specified event is included in a plurality of groups simultaneously, the route generation unit 232 can more efficiently search the route between the event in the corresponding event location group and the event in a different event location group.

FIG. 5 is a diagram showing a schedule table relative to the events of the user according to an embodiment of the present invention. The schedule table 500 includes an event time field 510, an event name field 520, a group position field 530, an event location field 540, and a priority field 550.

The event time field 510 includes a date field 511 and a detail time field 512. The date field 511 describes the date on which an event is to be performed, and the detail time field 512 describes the start time and completion time of the corresponding event. Here, the date may be a calendar time concept, such as year, month, and day, or a time concept, such as a weekday, weekend, the first Saturday, or before Thanksgiving, the time concept being any concept the user uses in the user's personal life. When the time concept is used, the generation unit 230 converts the time concept into a calendar date and thereby generates the schedule and route.

The event name described in the event name field 520 can be selected and input by the user. The user can confirm the event on the basis of the event name output through the output unit 290.

The group position field 530 describes the position information of the event location group including the location where the corresponding event is performed. For example, the event location group includes natural features, districts, points of interest (POI), or a location range assigned by the user. The position information thereof may be the group position information.

The event location field 540 describes position information about the location where the corresponding event is to be performed. The event position information may be more detailed position information than the group position information. For example, the event position information may include coordinates on a map, such as WGS-84 (World Geodetic System 1984).

The priority of the event described in the priority field 550 may be set by the user or may be set by the schedule generation unit 231. For example, the schedule generation unit 231 may correct the event information described in the schedule table 500 or may add an additional event with reference to the activity pattern of the user. In correcting the specified event or adding the additional event, the schedule generation unit 231 may set the priority of the corresponding event according to the activity pattern of the user.

Meanwhile, the date field 511, the detail time field 512, the group position field 530, or the event location field 540 relative to the specified event may not be described. That is, when the date is not important to perform the event even if the event should be performed at a specified detail time and a specified location, the user may not describe the date. For example, when the user who has a lunch engagement with another person at a specified location is near another person, the route generation unit 232 may include lunch with another person in the route with reference to time information, that is, lunchtime, and position information, that is, the specified location, regardless of the date.

Figure 6:
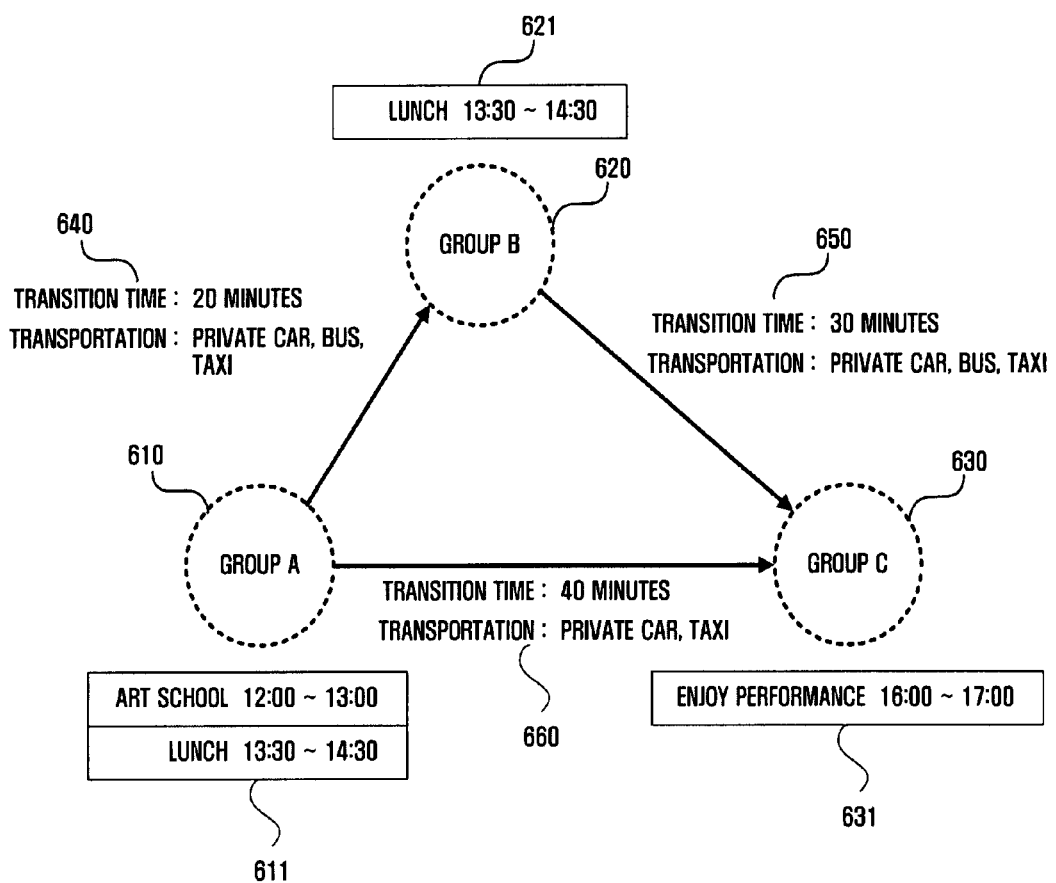
FIG. 6 is a diagram showing a schedule and a route according to an embodiment of the present invention.

FIG. 6 is a diagram showing a schedule and a route according to an embodiment of the present invention. FIG. 6 shows events in each of groups 610, 620, and 630 and routes determined according to the example situations.

The event information collected by the input unit 210 or the information collection unit 220 is transferred to the schedule generation unit 231, and the schedule generation unit 231 generates a schedule using the transferred event information. Accordingly, the events 611 in group A 610 include "ART SCHOOL" and "LUNCH".

The event "ART SCHOOL" of the events 611 in group A 610 and the event "ENJOY PERFORMANCE" of the events 631 in group C 630 have the highest priority, the route generation unit 232 searches a route that connects group A 610 and group C 630. In searching the route, the route generation unit 232 can refer to the expected transition time between group A 610 and group C 630 and usable transportation 660. Referring to FIG. 6, since the event "LUNCH" is expected to be completed at 14:30, the start time of the event "ENJOY PERFORMANCE" is just 16:00, and the transition time is 40 minutes, it can be expected that all the events can be performed reasonably. Therefore, the route generation unit 232 can generate the route that connects group A 610 and group C 630.

However, when a difference between the completion time of the event in group A 610 and the start time of the event in group C 630 is smaller than the transition time, the route generation unit 232 can exclude one of either the event 611 in group A 610 or the event in group C 630 in consideration of the priority of each event, possible transportation, and transition to a different event location and generate a route for the user to perform the other event.

Since the event "LUNCH" described in FIG. 6 can be confirmed by the activity pattern of the user, the schedule generation unit 231 adds this event to the schedule table 500.

Meanwhile, when the user does not assign a date, but a lunch engagement, for example, with another person in group B 620 is described in the schedule table 500, the route generation unit 232 can generate a route that connects group A 610 and group B 620. At this time, the route generation unit 232 can determine whether or not to include group B 620 in the route with reference to an expected transition time from group A 610 to group B 620 and usable transportation 640, and an expected transition time from group B 620 to group C 630 and usable transportation 650.

Figure 7:
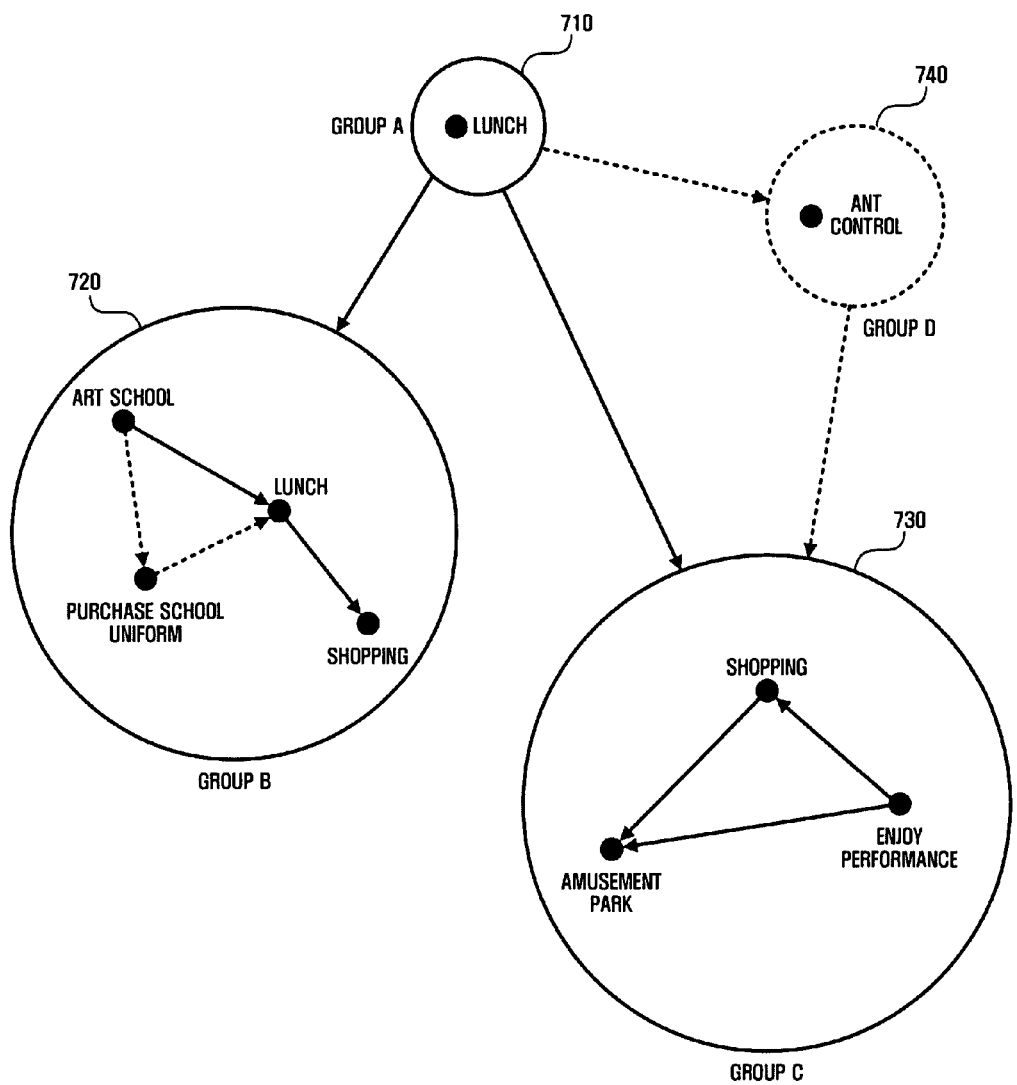
FIG. 7 is a diagram showing a case where the schedule and the route are output according to an embodiment of the present invention.

FIG. 7 is a diagram showing a case where a schedule and a route are output according to an embodiment. FIG. 7 shows events in each of event location groups 710, 720, 730, and 740, routes between event locations, and routes between the event location groups.

The user can confirm the schedule and the route shown in FIG. 7 output through the output unit 290, and can transit to the event location or the group position. Meanwhile, though not described in FIG. 7, the transition time between the event locations or the group positions and transportation can be displayed.

Further, FIG. 7 shows the schedule and the route that are visually displayed on the display unit of the output unit 290. Alternatively, the schedule and the route can be output through the speaker of the output unit 290 auditorily.

In FIG. 7, a route indicated by a dotted line represents a route according to a low priority. That is, the route generation unit 232 preferentially searches a route following the events "ART SCHOOL", "LUNCH", and "SHOPPING" in group B 720. When the event "ART SCHOOL" is completed earlier than an expected time, the route generation unit 232 may insert the event "PURCHASE SCHOOL UNIFORM" before the event "LUNCH".

Similarly, the insertion of "ANT CONTROL" as an event in group D 740 is determined according to the completion time of 'LUNCH' as an event in group A 710.

Meanwhile, the route generation unit 232 can generate group B 720 and group C 730 connected to group A 710 simultaneously, and group B 720 and group C 730 can be output through the output unit 290.

That is, two routes can be output simultaneously. In this case, one route can be selected by the user, and a route according to the selected route can be successively generated.

For example, when the user selects transition from group 710 to group B 720, the route generation unit 232 excludes transition to group C 730 in the route. Then, transition to group D 740 is excluded in the route. Meanwhile, when the user selects transition from group A 710 to group C 730, the route generation unit 232 excludes transition to group A 710 from the path and determines whether or not to transit to group D 740.

FIG. 8 is a flowchart showing a process of generating a schedule and a route according to an embodiment.

In order to provide a route, the information collection unit 210 of the schedule and route providing apparatus 200 analyzes information input through the input unit 210 to extract an event to be added to a schedule (S810).

The collected information is transferred to the schedule generation unit 231, and the schedule generation unit 231 generates a schedule table 500 relative to the extracted events (S820). The generated schedule table 500 is stored in the storage unit 240, and the control unit 250 controls the position confirmation unit 260 and the time confirmation unit 270 to confirm current position information and time (S830) and receives the confirmed current position information and time. Meanwhile, when the position confirmation unit 260 and the time confirmation unit 270 are not provided in the schedule and route providing apparatus 200, the confirmation process of the current position information and time may be omitted.

The confirmed position information and time are transferred to the route generation unit 232, and the route generation unit 232 searches a route according to the schedule table 500 stored in the storage unit 240 (S840). That is, the route generation unit 232 searches the route between the event locations and the event location groups in consideration of position, priority, transition time, and transportation such that the user can effectively perform as many events as possible within a given time.

The searched route is stored in the storage unit 240, and the schedule generation unit 231 may reconstruct the schedule relative to the events with reference to the searched route (S850). In reconstructing the schedule, the schedule generation unit 231 can use the activity pattern of the user recognized by the pattern recognition unit 280.

When no additional input is received from the user, the schedule and route providing apparatus 200 may consider at the completion time of the specified event that the corresponding event is completed. Further, the user may transit to the corresponding event location, and when the event is completed, may input a flag indicating that the event is completed. In such a manner, when the user inputs the flag indicating that the specified event is completed or when the schedule and route providing apparatus 200 judges that the event is completed, the control unit 250 confirms a time difference between the just-completed event and an event to be subsequently performed (S860). Then, when it is judged that an event having the lower priority can be sufficiently performed, the control unit 250 controls the generation unit 230 to regenerate a schedule and a route for the event having the lower priority (S870).

The regenerated schedule and route are transferred to the output unit 290, and the output unit 290 outputs the transferred schedule and route (S880). That is, the output unit 290 outputs the route visually or auditorily.

Although the present invention has been described in connection with the embodiments of the present invention, it will be apparent to those skilled in the art that various modifications and changes may be made thereto without departing from the scope and spirit of the invention. Therefore, it should be understood that the above embodiments are not limitative, but illustrative in all aspects.

According to the apparatus and method of providing a schedule and a route of the present invention, the route of the user is provided in consideration of various factors related to the activity patterns and the activities of the user, such that the user can perform as many events as possible within a given time.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. An apparatus of providing a schedule and a route, the apparatus comprising:
    an information collection unit analyzing input information and extracting an event to be added to a first schedule;
    a pattern recognition unit extracting an activity pattern of a user with reference to a past route and past event information; and
    a generation unit applying the activity pattern to at least one event of the first schedule and the extracted event to generate a second schedule, generating a first route between event locations with reference to position information and time information of each event in the second schedule, generating a third schedule, to which an additional event is added, with reference to a transition time between the event locations and an actual event time, and generating a second route for the additional event in the third schedule.

2. The apparatus of claim 1, wherein the generation unit comprises:
    a schedule generation unit generating the first schedule, the second schedule, and the third schedule; and
    a route generation unit generating the first route and the second route.

3. The apparatus of claim 2, wherein the schedule generation unit sets an event location group having at least one event with reference to the position information and the activity pattern of the user, and extracts an expected event time of each event in the event location group.

4. The apparatus of claim 3, wherein the schedule generation unit sets the event location group on the basis of districts or sets the event location group having at least one event within a predetermined radius.

5. The apparatus of claim 3, wherein the schedule generation unit sets the event location group with reference to terms in the names of the event locations.

6. The apparatus of claim 3, wherein the generation unit generates the second schedule and the first route having events having a highest priority among the events in the event location group, and generates the third schedule and the second route having events having a lower priority than the events having the highest priority with reference to the transition time between the event locations and the actual event time.

7. The apparatus of claim 6, wherein, in generating the third schedule and the second route, the generation unit determines whether to include event locations of events in a different event location group from the event location group in the second schedule and the first route.

8. The apparatus of claim 1, wherein, in generating the second schedule or the third schedule, the schedule generation unit resets a prescribed start time of each event.

9. The apparatus of claim 2, wherein the route generation unit generates the first route and the second route with reference to current position information and current time information.

10. The apparatus of claim 2, wherein the route generation unit generates the first route or the second route with reference to a route generated by at least one of a position-based search unit generating a route on the basis of current position and event location, a priority-based search unit generating a route according to a priority assigned to each event, a transition time search unit generating a route on the basis of a transition time between the event locations, and a transportation search unit generating a route on the basis of transportation for transition between the event locations.

11. A method of providing a schedule and a route, the method comprising:
    analyzing input information and extracting an event to be added to a first schedule;
    extracting an activity pattern of a user with reference to a past route and past event information;
    applying the activity pattern to at least one event in the first schedule and the extracted event to generate a second schedule;

generating a first route between event locations with reference to position information and time information of each event in the second schedule;

generating a third schedule, to which an additional event is added, with reference to a transition time between the event locations and an actual event time; and generating a second route for the additional event in the third schedule.

12. The method of claim 11, further comprising:

setting an event location group having at least one event with reference to the position information and the activity pattern of the user; and extracting an expected event time of each event in the event location group.

13. The method of claim 12, wherein the setting of the event location group sets the event location group on the basis of districts or sets the event location group having at least one event within a predetermined radius.

14. The method of claim 12, wherein the setting of the event location group comprises setting the event location group with reference to terms in names of the event locations.

15. The method of claim 12, further comprising:

generating the second schedule and the first route including only events having a highest priority among the events in the event location group; and generating the third schedule and the second route including events having a lower priority than the events having the highest priority with reference to the transition time between the event locations and the actual event time.

16. The method of claim 15, wherein the generating of the third schedule and the second route comprises determining whether to include event locations of events in a different event location group from the event location group in the second schedule and the first route.

17. The method of claim 15, wherein the generating of the second schedule or the third schedule comprises resetting a prescribed start time of each event.

18. The method of claim 15, wherein the generating of the first route and the second route comprises generating the first route and the second route with reference to current position information and current time information.

19. The method of claim 11, wherein the generating of the first route or the second route comprises generating the first route or the second route with reference to a route generated based on at least one of a current position and a current event location, a priority assigned to each event, a transition time between the event locations, and transportation available for transition between the event locations.

* * * * *